E. SCHEFER.
AUTOMATIC CONTROL FOR WINDMILLS.
APPLICATION FILED APR. 12, 1920.

1,366,326. Patented Jan. 18, 1921.
2 SHEETS—SHEET 1.

INVENTOR
ERNEST SCHEFER.
BY Chas. E. Townsend
ATTORNEY

E. SCHEFER.
AUTOMATIC CONTROL FOR WINDMILLS.
APPLICATION FILED APR. 12, 1920.
1,366,326.
Patented Jan. 18, 1921.
2 SHEETS—SHEET 2.
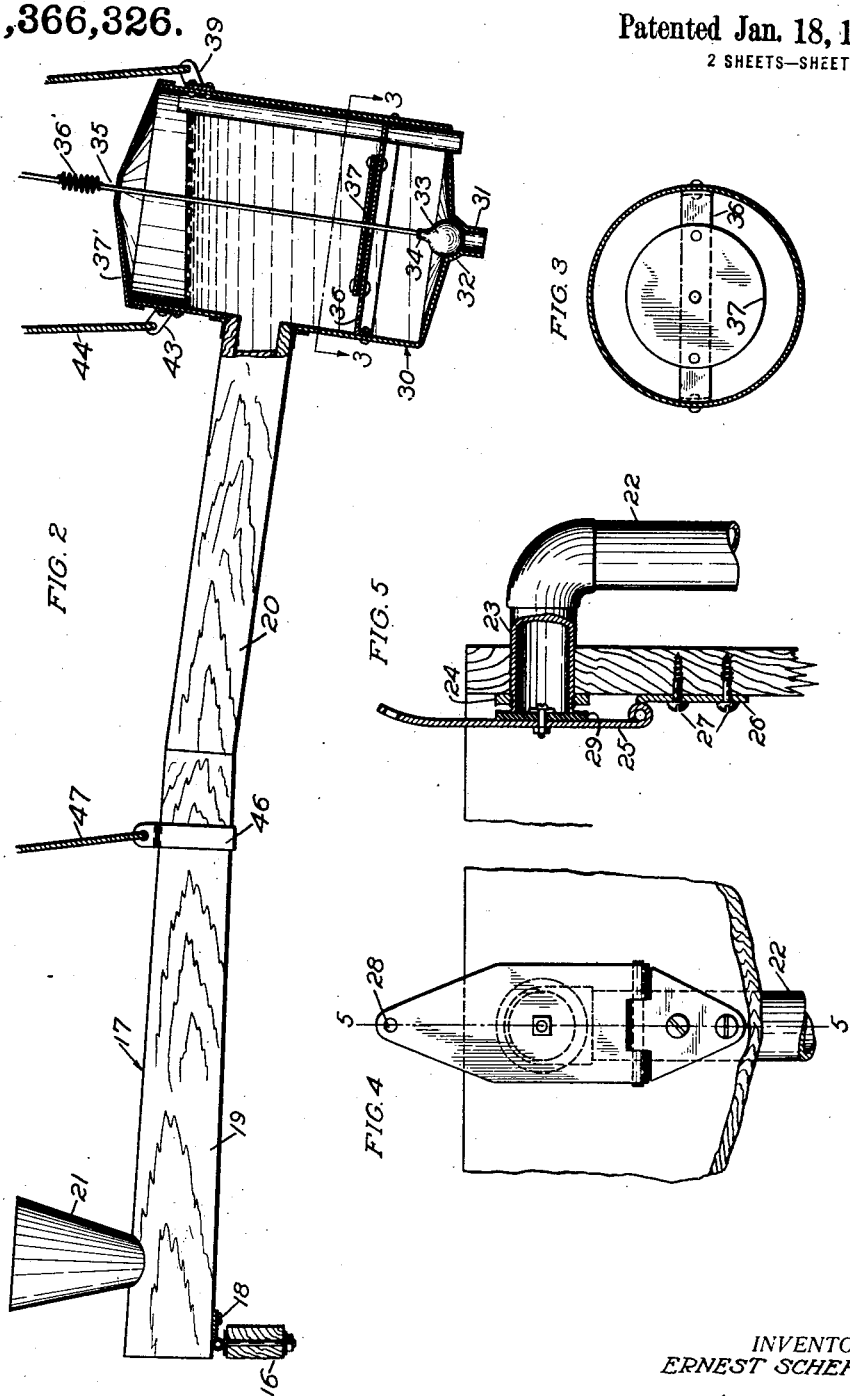

UNITED STATES PATENT OFFICE.

ERNEST SCHEFER, OF SANTA ROSA, CALIFORNIA.

AUTOMATIC CONTROL FOR WINDMILLS.

1,366,326.	Specification of Letters Patent.	Patented Jan. 18, 1921.

Application filed April 12, 1920. Serial No. 373,154.

*To all whom it may concern:*

Be it known that I, ERNEST SCHEFER, citizen of the United States, residing at Santa Rosa, in the county of Sonoma and State of California, have invented new and useful Improvements in Automatic Controls for Windmills, of which the following is a specification.

This invention relates to wind mills such as used for the pumping of water and the like.

An object of the invention is to provide an automatic stop and start controlling apparatus for the wind wheel, said time of starting and stopping being regulated by the level of water in the storage tank.

It is also an object of this invention to provide an apparatus which will simultaneously with the stopping of the wind wheel also stop the over-flow from the storage tank and thus secure a considerable saving of water.

It is a general object of the invention to provide means as above characterized which is simple in its parts, inexpensive to manufacture and positive in its operation.

Other objects will hereinafter appear.

The invention consists in the novel features of construction, combination and arrangement of parts to be hereinafter more fully described, claimed and illustrated in the accompanying drawings in which;

Fig. 2 is a side elevation of the trough and with the hopper shown in section to more clearly illustrate the same.

Fig. 3 is a sectional view on the line 3—3 of Fig. 2.

Fig. 4 is a rear elevation of the over-flow valve for the storage tank.

Fig. 5 is a central sectional view on the line 5—5 of Fig. 4.

Figure 1:
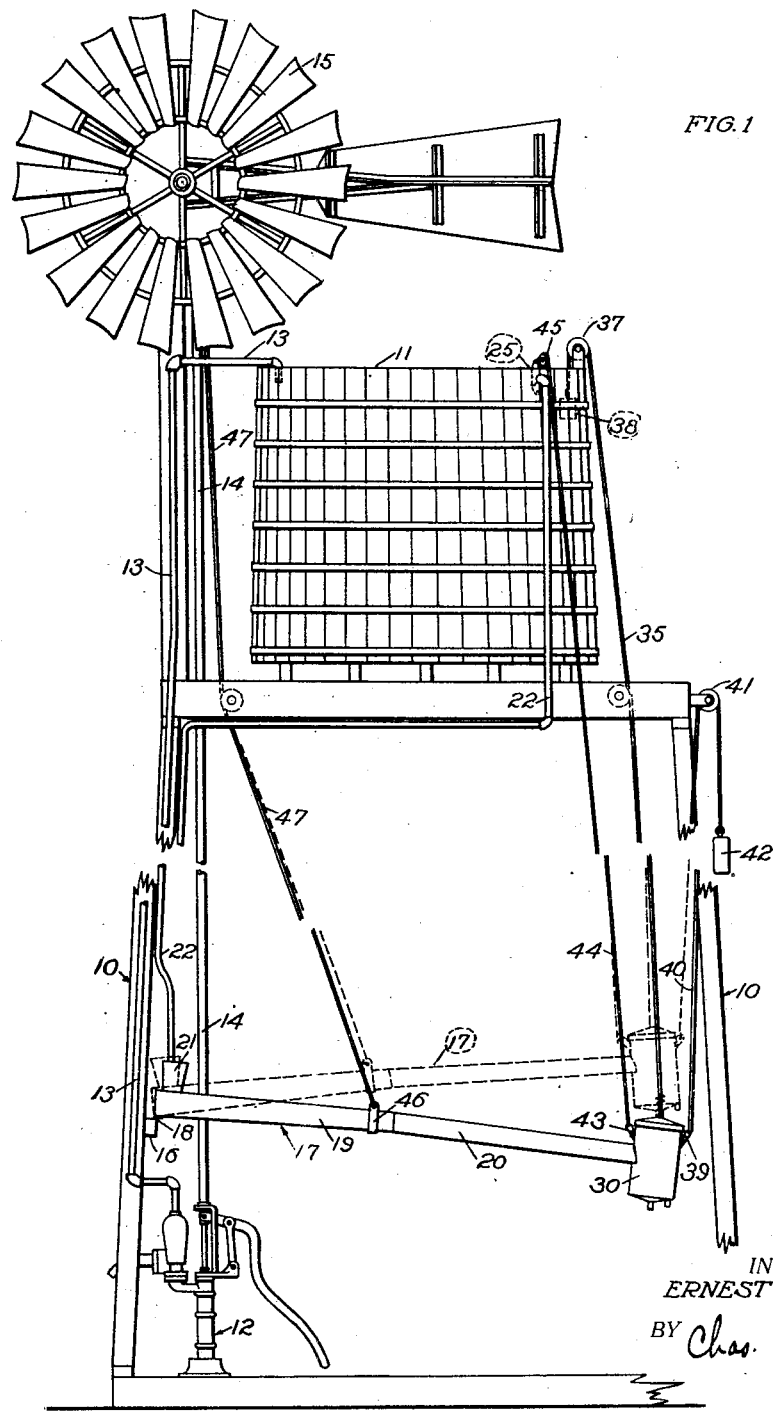
Figure 1 is a side elevation of a wind mill illustrating the embodiment of my invention.

Referring to the drawings more particularly, 10 indicates generally a tower upon which is mounted the storage tank 11. A pump 12 has a discharge pipe 13 communicating with the storage tank 11. The pump is operatively connected through the rod 14 to the wind wheel 15. The connection between the rod 14 and shaft of the wind wheel 15 is of the conventional type and not shown. To the side of the tower 10 there is suitably secured a block 16 to which a trough 17 is hingedly secured as indicated at 18. The trough 17 comprises the two sections 19 and 20, said sections being triangular in shape and the section 20 extending slightly downwardly from the section 19. On the inner end of the section 17 there is provided a funnel 21 into which extends a pipe 22, said pipe communicating with the over-flow of the storage tank 11. The upper end of the over-flow pipe terminates in a nipple 23 which is threaded to the circular plate 24 which is secured on the inner side of the storage tank. An over-flow valve is provided to close the upper end of the over-flow pipe 22, said valve being substantially a strap hinge and comprising the two members 25 and 26 which are hingedly secured to one another and the member 26 secured to the storage tank 11 by screws indicated at 27. The upper hinge member 25 is provided at its upper end with an opening 28 and also with a circular packing member 29 secured thereto and adapted to close the upper end of the over-flow pipe 22 when the hinge member 25 is in its raised position as illustrated in Figs. 4 and 5.

On the outer end of the trough section 20 there is secured a hopper 30, said hopper having in its bottom a discharge pipe 31 which terminates at its upper end in a semi-spherical portion 32 adapted to receive a ball 33. The ball 33 is preferably of rubber, having a projection 34 formed thereon to which is secured a wire 35. Above the ball there is provided a transverse member 36 having a central opening therein and upon this member there is mounted a circular plate 37 having also a central opening registering with the opening in the member 36. These openings serve as a guide for the wire 35 which passes therethrough and the plate 37 further serves to protect the ball 33 from the force of the water flowing into the hopper 30 from the trough 17. The hopper is further provided with a cover 37' having a central opening through which the wire 35 may pass. The wire 35 is provided in its length with a coil spring 36', the purpose of which will later become evident. The wire extends upwardly to the storage tank and over an idler pulley 37 and its end connected to a float 38. On the hopper there is secured a lug 39 to which one end of a wire 40 is connected, said wire passing over an idler pulley 41 which is secured to the tower as illustrated in Fig. 1 and the opposite end of the wire secured to a weight 42. On the opposite side of the hopper there is another lug 43 suitably secured and to which the one end of a wire 44 is connected, said wire passing over an idler pulley 45 secured on the storage tank and the opposite end of the wire connected to the upper member 25 of the over-flow hinge valve.

Near the middle of the trough 19 there is provided a collar 46 to which the one end of the control wire 47 is secured, the other end of the wire being secured to the braking or stopping means for the wind wheel not shown.

In the operation of the present apparatus, assuming that the trough 19 is in the dotted line position shown in Fig. 1, the following conditions would result:

The over-flow valve for the storage tank would be open and the wind wheel would be unlocked or permitted to operate the pump for supplying the storage tank with water.

Now assuming that the tank becomes filled with water and water flows from the over-flow pipe into the trough 17. When one end of the trough has been practically filled, the water will begin to flow into the hopper 30. When the hopper 30 becomes partially filled, the weight thereof will pull the free end of the trough downwardly against the weight 42. When this occurs the wires 47 and 44 will be likewise pulled downwardly whereby the wind wheel 15 and the over-flow valve of the storage tank will be simultaneously stopped and closed.

Now after the water in the storage tank has been drawn off so that the same reaches a pre-determined level, the float member 38 will exert a pull on the wire 35 and through the means of the coil spring 36 will unseat the ball 33 in a quick and jerking manner. This will permit the discharge of the water from the hopper 30 and the trough 17 may again resume its dotted line position as shown in Fig. 1.

While I have shown and described my invention as applied to controlling the water in a storage tank of a wind mill, it is to be understood that the same, with slight modifications, would be equally adaptable to similar uses where it was desired to maintain a predetermined level of fluid or water in an elevated storage tank.

Having thus described my invention what I claim and desire to secure by Letters Patent is:

1. In an apparatus of the class described including a storage tank and a remotely controllable source of supply therefor, in combination a trough hingedly secured at one end for radial movement thereof and having an inlet communicating with the over-flow of the storage tank, a hopper secured on its opposite end having a valve controlled outlet, a counter weight for holding the free end of the trough in a raised position and adapted to permit said end to move downwardly when the hopper receives water from the over-flow of the storage tank, a connecting means between the trough and controllable source of supply whereby the same may be caused to stop by the downward movement of the trough, a valve for said over-flow of storage tank and connecting means between said trough and valve whereby by downward movement of the trough the valve is simultaneously closed.

2. In an apparatus of the class described including an elevated storage tank and a remotely controllable source of supply therefor, in combination a trough hingedly secured at one end for radial movement thereof, said trough being inclined toward its longitudinal center from each end and having a spout inlet adjacent its hinged end, a pipe communicating with the overflow of the storage tank, and extending into said spout, a hopper secured on the free end of the trough, a counterweight for holding the free end of the trough in a raised position with respect to its hinged end, the raised position being such that water will flow over the inclined center of the trough and into the hopper previous to reaching the top of its spout inlet, whereby the free end of the trough is swung downwardly, connecting means whereby the downward movement of the trough will stop the source of supply, a valve for the overflow, and connecting means whereby the same downward movement of the trough will close said valve.

3. In an apparatus of the class described including a storage tank and a remotely controllable source of supply therefor, in combination a trough hingedly secured at one end for radial movement thereof and having an inlet communicating with the overflow of the storage tank, a hopper secured on its opposite end having a valve controlled outlet, a counterweight for holding the free end of the trough in a raised position and adapted to permit said end to move downwardly when the hopper receives water from the overflow of the storage tank, a connecting means between the trough and a controllable source of supply whereby the same may be caused to stop by the downward movement of the trough, a flap valve for closing the overflow, said valve adapted to be normally open, and connecting means between said trough and flap valve whereby the valve will be closed upon the downward movement of the trough.

4. In an apparatus of the class described including a storage tank and a remotely controllable source of supply therefor, in combination a trough hingedly secured at one end for radial movement thereof and having an inlet communicating with the overflow of the storage tank, a hopper secured on its opposite end having a valve controlled outlet, a counterweight for holding the free end of the trough in a raised position and adapted to permit said end to move downwardly when the hopper receives water from the overflow of the storage tank, a connecting means between the trough and a controllable source of supply whereby the same may be caused to stop by the downward movement of the trough, a flap valve for closing the overflow, said valve adapted to be normally open, connecting means between said trough and flap valve whereby the valve will be closed upon the downward movement of the trough, a float for the storage tank and connecting means between said float and valve controlled outlet of the hopper whereby the same will be opened when the water in the storage tank has reached a predetermined level and the water in said hopper permitted to discharge and thus allowing the trough to return to its original position, whereby the source of supply is again started and the overflow flap valve returned to its open position.

5. In an apparatus of the class described including an elevated storage tank having an overflow outlet and a remotely controllable source of supply, in combination a trough hingedly secured at its one end for radial movement thereof, said trough being inclined toward its longitudinal center from each end, a connection between the overflow of the storage tank and adjacent the hinged end of the trough, said connection permitting radial swinging movement of the trough, a hopper on the free end of the trough, a counterweight for holding the free end of the trough in a raised position with respect to its hinged end, said weight being adapted to permit downward swinging of the free end of the trough when a predetermined quantity of water has entered the hopper, connecting means between the trough and source of supply whereby the same is stopped upon the downward movement of the free end of the trough, a valve for the overflow of the storage tank, adapted to remain normally open, and connecting means whereby said valve is closed upon the downward movement of the free end of the trough.

In testimony whereof I have hereunto set my hand in the presence of two subscribing witnesses.

ERNEST SCHEFER.

Witnesses:
Jos. P. BRADY,
D. W. CAGOIL.